United States Patent [19]
Schweid

[11] Patent Number: 5,768,432
[45] Date of Patent: Jun. 16, 1998

[54] SYSTEM AND APPARATUS FOR PIXEL GROWTH COMPENSATION IN A HYBRID ERROR DIFFUSION PROCESS

[75] Inventor: Stuart A. Schweid, Henrietta, N.Y.

[73] Assignee: Xerox Corporation, Stamford, Conn.

[21] Appl. No.: 901,383

[22] Filed: Jul. 28, 1997

Related U.S. Application Data

[63] Continuation of Ser. No. 655,548, May 30, 1996, abandoned.

[51] Int. Cl.⁶ .................................................. H04N 1/405
[52] U.S. Cl. ...................... 382/237; 382/252; 382/270; 358/456; 358/466
[58] Field of Search .............................. 382/237, 252, 382/270; 358/456, 466, 457, 458, 459, 460, 298; 395/109

[56] References Cited

U.S. PATENT DOCUMENTS

| | | |
|---|---|---|
| 4,829,587 | 5/1989 | Glazer et al. |
| 4,876,610 | 10/1989 | Ohsawa et al. ............... 358/456 |
| 5,034,990 | 7/1991 | Klees ........................... 382/252 |
| 5,045,952 | 9/1991 | Eschbach ...................... 358/466 |
| 5,121,447 | 6/1992 | Tanioka et al. ............... 382/252 |
| 5,258,854 | 11/1993 | Eschbach. |
| 5,268,774 | 12/1993 | Eschbach ...................... 358/466 |
| 5,271,070 | 12/1993 | Truong et al. ................. 382/252 |
| 5,274,472 | 12/1993 | Williams ....................... 358/456 |
| 5,317,653 | 5/1994 | Eschbach et al. ............. 358/456 |
| 5,325,211 | 6/1994 | Eschbach ...................... 358/466 |
| 5,327,256 | 7/1994 | Kang et al. |
| 5,410,615 | 4/1995 | Mailloux. |
| 5,442,461 | 8/1995 | Levien .......................... 358/456 |
| 5,454,052 | 9/1995 | Kojima ......................... 358/456 |
| 5,528,384 | 6/1996 | Metcalfe et al. .............. 358/456 |
| 5,598,204 | 1/1997 | Harrington .................... 358/298 |

OTHER PUBLICATIONS

A Survey of Electronic Techniques for Pictorial Reproduction by J.C. Stoffel and J.F. Moreland IEEE Transactions on Communications, vol. COM-29, No. 12, Dec. 1981, pp. 1898–1925.

*Primary Examiner*—Scott Rogers
*Attorney, Agent, or Firm*—Michael J. Nickerson

[57] ABSTRACT

An error diffusion process adds an error value to an input grey image value to produce a modified input grey image value before comparing the modified input grey image value with a predetermined threshold value. A rendering value and error is generated based on the comparison. An error equal to the modified input grey value is generated when the modified input grey value is less than the predetermined threshold value, and an error equal to the modified input grey value minus a black reference value is generated when the modified input grey value is equal to or greater than the predetermined threshold value. This error value is further compensation for pixel growth when the output of the previously processed pixel is not equal to the output of the presently processed pixel.

21 Claims, 14 Drawing Sheets

SYSTEM AND APPARATUS FOR PIXEL GROWTH COMPENSATION IN A HYBRID ERROR DIFFUSION PROCESS

This application is a continuation of application Ser. No. 08/655,548, filed May 30, 1996, now abandoned.

FIELD OF THE PRESENT INVENTION

The present invention is directed to an error diffusion process which allows for adjustment of pixel growth in a printer or printing system. More specifically, the present invention is directed to an error diffusion process for adjusting the diffused error value so as to compensate for pixel growth produced in a printing device.

BACKGROUND OF THE PRESENT INVENTION

Error diffusion is a common technique for converting a grey scale image to a binary image. This process, however, assumes that a printer is an ideal device wherein black pixels and white pixels never change in size (the pixel's percentage of area coverage is independent of the pixel pattern output). FIG. 1 shows the block diagram of a conventional error diffusion process.

As illustrated in FIG. 1, input grey video is inputted to an adder 1 wherein slowscan error, which represents error from the processing of the previous scanline of pixels, stored in a FIFO 6 is added to the input grey video. Moreover, fastscan error from an error distribution circuit 5 is also added to the input grey video at adder 1. The fastscan error from the error distribution circuit 5 represents the error from processing the previous pixel in the same scanline. The modified input grey video ($Pix_N$) is then fed to a comparator 2 which compares the modified input grey video with a threshold value. Based on the comparison with the threshold value, the comparator 2 outputs a binary output of either 1 or 0. The modified input grey video is also fed to a subtraction circuit 4 and a multiplexer 3. Subtraction circuit 4 generates a value representative of the difference between a black reference value and the modified input grey video value. This difference is also fed to multiplexer 3. Multiplexer 3 selects either the difference value or the modified input grey video value as the pixel error for the presently processed pixel based on the binary output from comparator 2.

This pixel error is fed to the error distribution circuit 5 which utilizes a plurality of weighting coefficients to distribute the error to various adjacent pixels.

As noted above, a conventional error diffusion process assumes that the printer is an ideal device wherein the black pixels and white pixels never change in size. However, in reality, the size of the pixels are not fixed. In write black xerographic printers, black pixels tend to grow. If a single black pixel is output on a piece of paper, it's area will be larger than $1/N^2$, where the printer's resolution is N pixels per inch. For example, if a black pixel is placed down in an area where both of the adjacent pixels in the fastscan direction are black, the resulting area coverage in the fastscan direction will not grow, since the area it can grow into is already black. However, if the black pixel is placed down in an area where both of the adjacent pixels in the fastscan direction are white, the resulting area coverage in the fastscan direction will grow, since the area it can grow into is not already black.

The amount of coverage of a pixel is therefore dependent on the type of pixels surrounding it. For images using error diffusion, this results in output images whose apparent grey level is not a function of just the mean grey level input, but also of the grey level distribution and printer properties.

Conventionally, a tonal reproduction curve has been used to correct for the non-ideal printer properties. The problem with this approach is that the tonal reproduction curve needed for documents that are pictorial grey scale will be different from printing documents that are halftone pictures (pictures that were printed and re-scanned). In order to use multiple tonal reproduction curve approach, it is necessary to distinguish between these two types of pictures prior to processing via segmentation. This is often a complicated and expensive approach. Moreover, this approach does adequately compensate for pixel growth.

Thus, the present invention proposes a system which compensates for the printer property of pixel growth: the phenomena where black (white) pixels tend to grow into white (black) areas. The present invention also proposes a system which decreases dependency of the output apparent grey level on input grey level distributions, thereby making printing more robust across different input document types and rendering techniques. This is realized by detecting black/white pixel borders and then updating the error propagated in the error diffusion process to account for the pixel growth.

SUMMARY OF THE PRESENT INVENTION

One aspect of the present invention is a method of reducing a number of levels in a multi-level grey scale pixel value representing a pixel and diffusing an error generated from reducing the number of levels. The method receives the multilevel grey scale pixel value of a first resolution; generates a screened multi-level grey scale pixel value; reduces the number of levels in the screened multi-level grey scale pixel value; generates an error value as a result of the reduction process; modifies the generated error value based on a pixel growth compensation value dependent on a detection of a black/white edge between adjacent pixels; and diffuses the error value to multi-level grey scale pixel values of adjacent pixels.

A second aspect of the present invention is a system for reducing a number of levels in a multi-level grey scale pixel value representing a pixel and diffusing an error generated from reducing the number of levels. The system includes input means for receiving the multi-level grey scale pixel value, the multilevel grey scale pixel value having a first resolution; screening means for generating a screened multi-level grey scale pixel value; high addressability means for converting the screened multi-level grey scale pixel value to a second resolution, the second resolution being higher than the first resolution; reduction means for reducing the number of levels in the screened multi-level grey scale pixel value; pixel growth compensation means for generating a pixel growth compensation value based on a detection of a black/white edge between adjacent pixels; error means for generating a plurality of possible error values; selecting means for selecting an error value from the plurality of possible error values as a result of the reduction by said reduction means; summing means for adding the pixel growth compensation value to the selected error value; and error diffusing means for diffusing the selected modified error value to multi-level grey scale pixel values of adjacent pixels.

A third aspect of the present invention is a method of generating an error value. The method performs the steps of generating a screened multi-level grey scale pixel value representing a pixel having a first resolution; converting the screened multi-level grey scale pixel value to a second resolution, the second resolution being higher than the first resolution; thresholding the screened multi-level grey scale pixel value representing the pixel having the second resolution; generating the error value as a result of thresholding the screened multi-level grey scale pixel value, the error value having the first resolution; generating a pixel growth compensation value based on a detection of a black/white edge between adjacent pixels; and modifying the generated error value based on the generated effective spot area value.

A fourth aspect of the present invention is a printing system for rendering marks on a recording medium. The printing system includes receiving means for receiving a multi-level grey scale pixel value representing a pixel having a first resolution; screening means for generating a screened the multi-level grey scale pixel value; interpolation means for converting the screened multi-level grey scale pixel value to a second resolution, the second resolution being higher than the first resolution; binarization means for binarizing the converted multi-level grey scale pixel value so as to output a binary signal and an error value, the error value having a resolution equal to the first resolution; pixel growth compensation means for generating a pixel growth compensation value based on a detection of a black/white edge between adjacent pixels; modifying means for modifying the error value based on the generated pixel growth compensation value; diffusing means for diffusing the modified error value to multi-level grey scale pixel values corresponding to pixels adjacent to the pixel having the first resolution; and rendering means for converting the binary signal into a mark on the recording medium.

A fifth aspect of the present invention is a system for generating an error. The system includes receiving means for receiving a multi-level grey scale pixel value representing a pixel having a first resolution; screening means for generating a screened the multi-level grey scale pixel value; interpolation means for converting the screened multi-level grey scale pixel value to a second resolution, the second resolution being higher than the first resolution; binarization means for binarizing the converted multi-level grey scale pixel value so as to output a binary signal and an error value, the error value having a resolution equal to the first resolution; pixel growth compensation means for generating a pixel growth compensation value based on a detection of a black/white edge between adjacent pixels; and modifying means for modifying the error value based on the generated effective spot area value.

A sixth aspect of the present invention is a system for reducing a number of levels in a multi-level grey scale pixel value representing a pixel and diffusing an error generated from reducing the number of levels. The system includes input means for receiving the multi-level grey scale pixel value, the multi-level grey scale pixel value having a first resolution; screening means for generating a screened multi-level grey scale pixel value; reduction means for reducing the number of levels in the screened multi-level grey scale pixel value; pixel growth compensation means for generating a pixel growth compensation value based on a detection of a black/white edge between adjacent pixels; error means for generating an error value based on the reduction by said reduction means; means for adding the error value and the pixel growth compensation value to produce a modified error value; and error diffusing means for diffusing the modified error value to multi-level grey scale pixel values of adjacent pixels.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
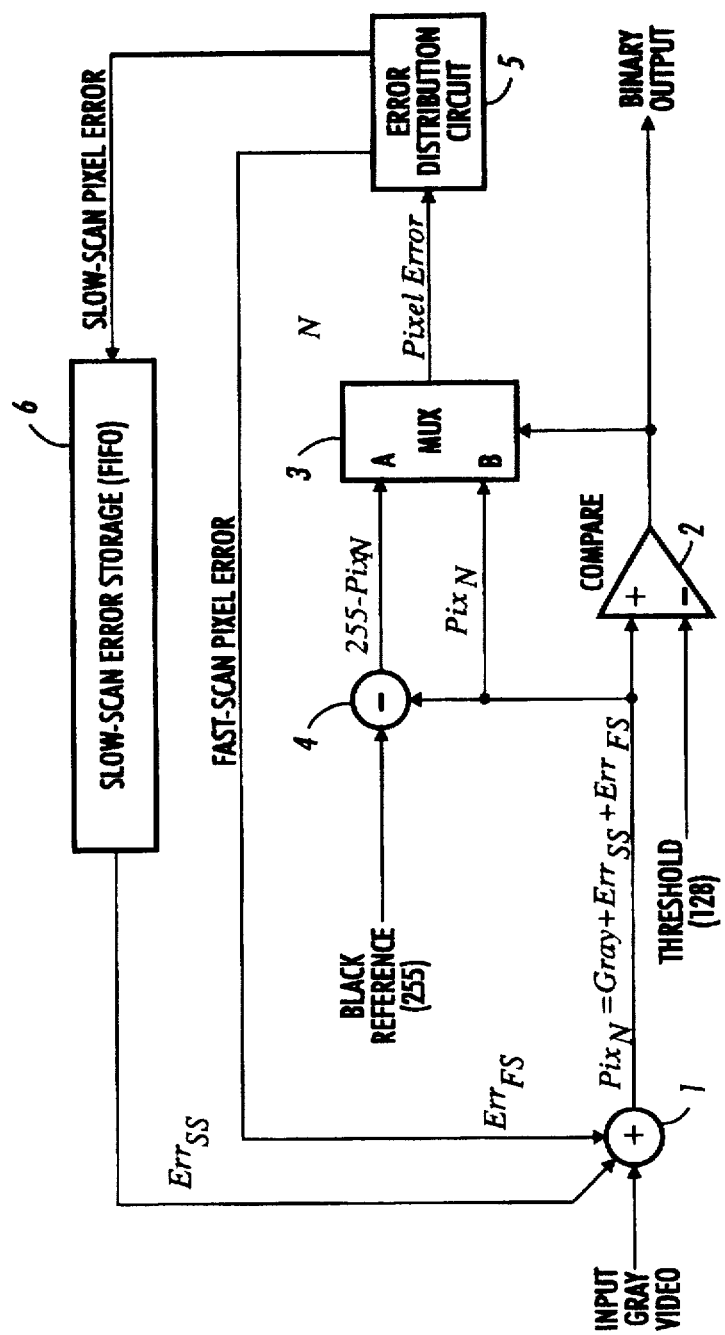
FIG. 1 shows a block diagram illustrating a conventional error diffusion circuit.

The following will be a detailed description of the drawings illustrating the present invention. In this description, as well as in the drawings, like references represent like devices, circuits, or circuits performing equivalent functions.

To demonstrate the concept of pixel growth, an example of one-dimensional growth will be discussed. For this example, black pixels are considered the ones that grow (alternatively, white pixels can be considered to shrink, thereby making the results identical), and it is assumed that a horizontal black line is printed by setting one hundred adjacent pixels to black. Each of the pixels in the center of the line cannot grow since they are surrounded by black pixels. The pixels at the end of the line, however, can grow. The black pixel on the left side of the line can grow into the white area on its left. In addition, the black pixel on the right side of the line can grow into the white are on its right. If is each end pixel encroaches one-half pixel into their adjoining white areas, the total length of the line would be 100+½+½ or 101 pixels.

In general, if a black pixel is adjacent to a white pixel, it can be assumed that the black pixel will grow Δp pixels into the white pixel. The amount of growth is assumed to be independent of direction. If the black and white pixels are juxtaposed, the amount of growth will not change.

If a black pixel is placed to the right of a white pixel, it is known that the pixel will encroach into the white area on its left. Similarly, if a white pixel is placed to the right of a black pixel, it is known that the black pixel will grow into the white area on its right. Therefore, if a black pixel is placed down next to a white pixel, its length will be the equivalent of the size of the "ideal" black pixel +Δp. In addition, the length of the white pixel next to it will decrease by Δp.

Similarly, if a white pixel is placed next to a black pixel, the black length will increase by Δp since the black pixel next to the white pixel will encroach into the white area. Moreover, the white length will decrease by Δp. It is noted that at each occurrence of a white/black edge, the aggregate length of the black pixel (aggregate length in two-dimensional is area) is increased by Δp and the aggregate length of the white pixel (aggregate length in two-dimensional is area) decreases by Δp, as compared to when no edge is present.

Given this model for growth, the present invention corrects for the pixel growth in the error diffusion process by changing the error distributed to future pixels. If no black/white edge is present, the error passed down should not be changed since there is no growth. However, if a black/white edge is present, the error should be updated to reflect the fact that the pixel is Δp more black and Δp less white than the ideal case. Thus, the error diffusion process, according to the present invention, is modified to reflect the following.

If the modified input grey video is greater than the threshold value, the output video signal is made equal to the value for a black pixel and the error generated from this process is equal to the modified grey video minus a black reference value. Moreover, if the modified input grey video is less than or equal to the threshold value, the output video value is equal to a value representing a white pixel and the error generated from this process would be equal to the modified input grey video minus a white reference value. However, if the video output value of the present pixel is not equal to the video output value of the previous pixel, the error value generated above is modified such that the error value is equal to the error value generated above plus Δp*(white value−black value).

In the case of black growth, the above error diffusion modification alters the error to assure that the aggregate length of black and white pixels remain unchanged, regardless of the value of pixel growth, Δp. This is true so long as the absolute value of Δp is less than 0.5.

Figure 5:
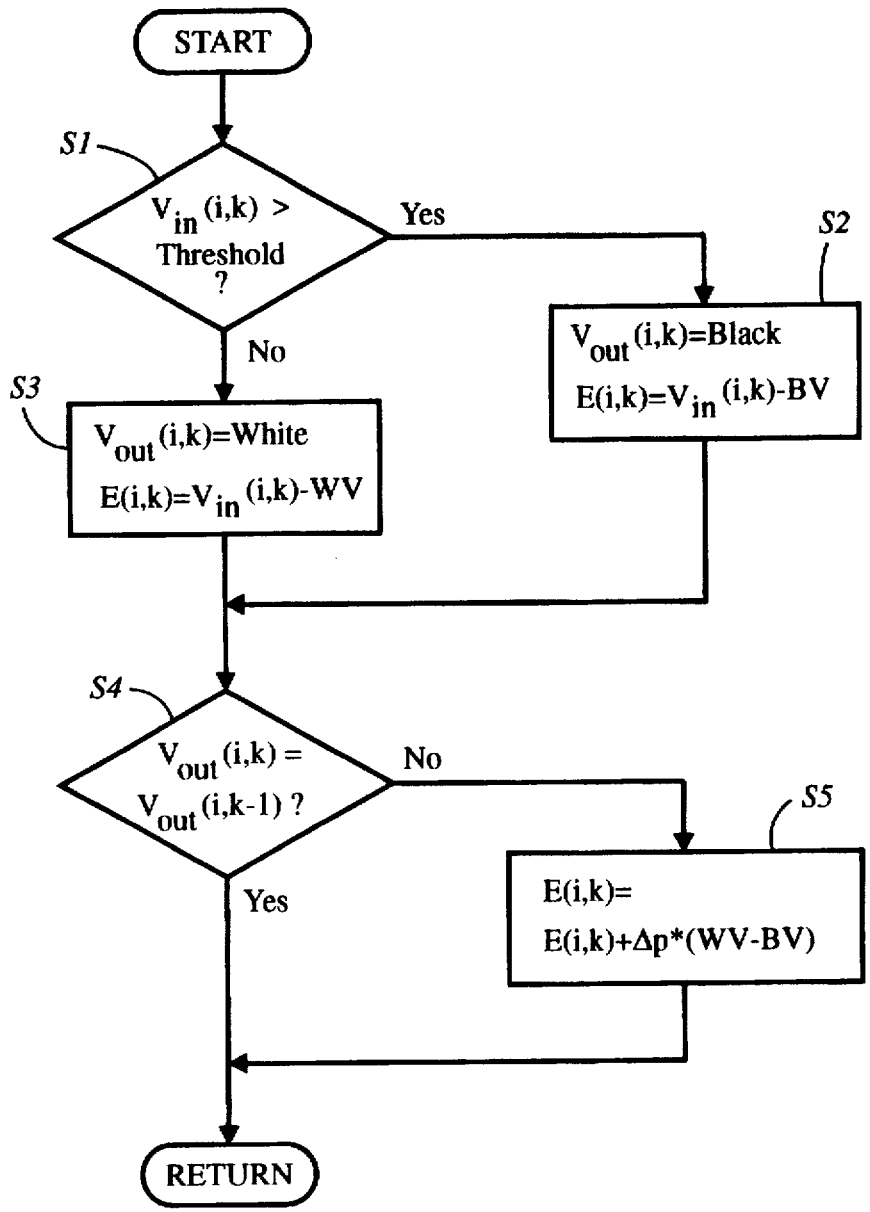
FIG. 5 is a flowchart illustrating one-dimensional pixel growth compensation according to the concepts of the present invention.

An example of a process which utilizes this one-dimensional approach is illustrated in FIG. 5. As shown in FIG. 5, Step S1 determines if the modified input video value is greater than a threshold value. If Step S1 determines that the modified input grey video is greater than the threshold value, Step S2 generates an error value equal to the modified grey video minus a black reference value. On the other hand, if Step S1 determines that the modified input grey video is less than or equal to the threshold value, Step S3 generates an error value equal to the modified input grey video minus a white reference value.

After completing steps S2 or S3, the process determines at step S4 whether the video output value of the present pixel is equal to the video output value of the previous pixel. If Step S4 determines that the video output value of the present pixel is not equal to the video output value of the previous pixel, Step S5 generates a new error value which is equal to the error value generated by either Step S2 or Step S3 plus Δp*(white value−black value) and this error value is diffused. On the other hand, if Step S4 determines that the video output value of the present pixel is equal to the video output value of the previous pixel, the error value generated by either Step S2 or Step S3 is diffused.

The pixel growth correction method of the present invention can also be extended to a two-dimensional case by independently considering upper and lower (slowscan) edges in addition to the right and left (fastscan) edges. More specifically, the pixel growth correction of the present invention in a two-dimensional situation is as follows.

If the modified input video value is greater than the threshold value, the video output value would be equal to a value representing a black pixel and the error generated from this process would be equal to the modified input grey video value minus a reference black value. Moreover, if the modified input grey video value is less than or equal to the threshold value, the output video value would be equal to a value representing a white pixel and the error created from this process would be equal to the modified input grey video value minus a white reference value.

However, if the output video value of the present pixel is not equal to the output video value of the previous pixel in the same scanline, the error value noted above would be modified such that the error value would equal the sum of the above generated error value plus $\Delta p_f$*(white value−black value). Moreover, if the output video value of the present pixel is not equal to the output video value of the same fastscan positioned pixel in the previous scanline, the error value noted above would be modified such that the error value would equal the sum of the above generated error value plus $\Delta p_s$*(white value−black value).

In this process, $\Delta p_f$ and $\Delta p_s$ represent the growth in the horizontal (fastscan) and vertical (slowscan) directions, respectfully. It is noted that in xerographic printers, these values are very similar since the amount of growth is an isotropic function for xerography. Although the present invention has been described utilizing the example of black pixel growth, the same process can be utilized to correct for white pixel growth in a write white printing machine. To make the above process applicable to a write white printing machine, the sign of $\Delta p_f$ and $\Delta p_s$ should be changed. No other modifications are necessary.

Figure 6:
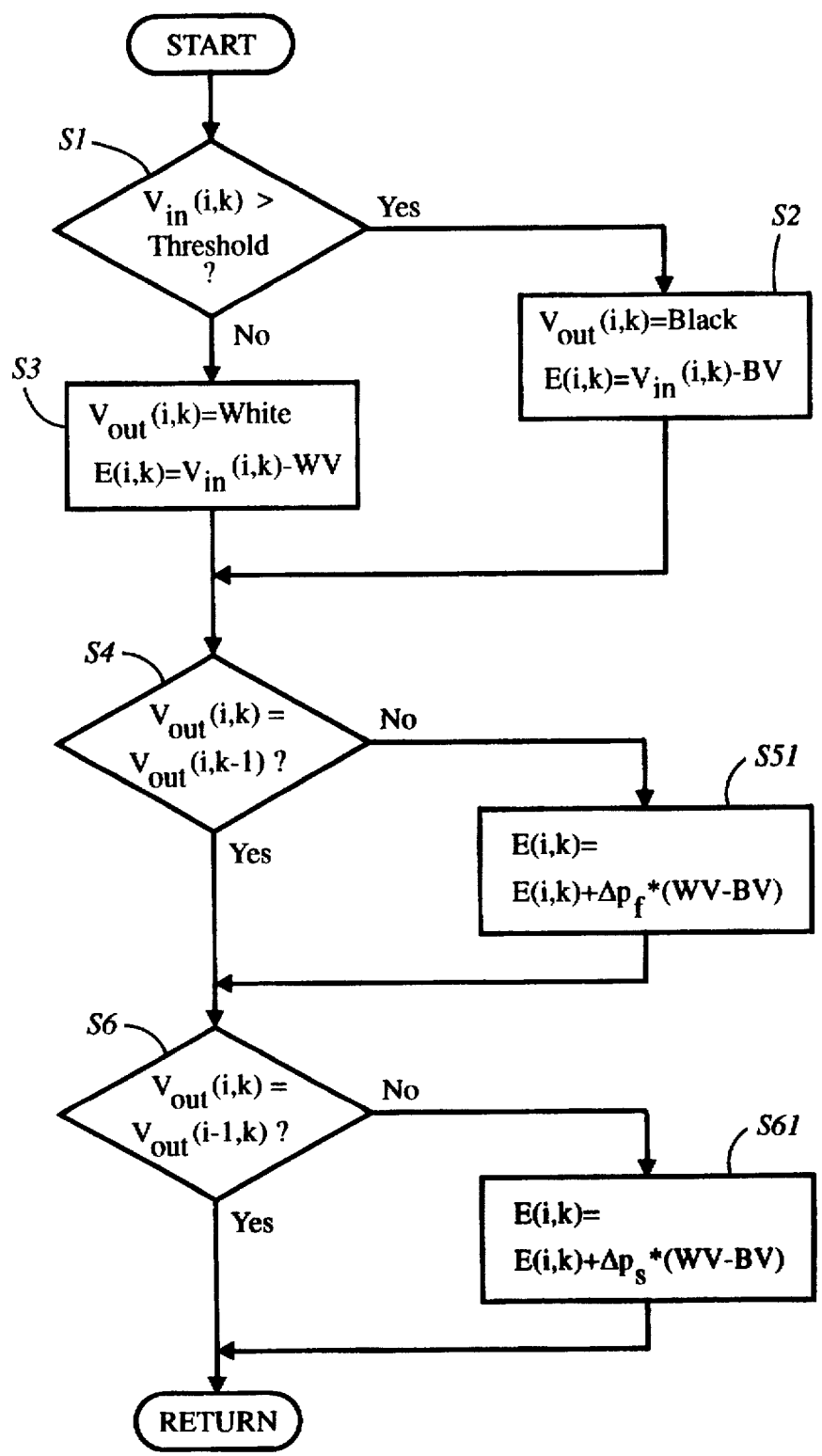
FIG. 6 is a flowchart illustrating two-dimensional pixel growth compensation according to the concepts of the present invention.

An example of a process which utilizes this two-dimensional approach is illustrated in FIG. 6. As shown in FIG. 6, Step S1 determines if the modified input video value is greater than a threshold value. If Step S1 determines that the modified input grey video is greater than the threshold value, Step S2 generates an error value equal to the modified grey video minus a black reference value. On the other hand, if Step S1 determines that the modified input grey video is less than or equal to the threshold value, Step S3 generates an error value equal to the modified input grey video minus a white reference value.

After completing steps S2 or S3, the process determines at step S4 whether the video output value of the present pixel is equal to the video output value of the previous pixel. If Step S4 determines that the video output value of the present pixel is not equal to the video output value of the previous pixel, Step S51 generates a new error value which is equal to the error value generated by either Step S2 or Step S3 plus $\Delta p_f$*(white value–black value) and this error is accumulated. On the other hand, if Step S4 determines that the video output value of the present pixel is equal to the video output value of the previous pixel, the error value generated by either Step S2 or Step S3 is accumulated.

After completing steps S4 or S51, the process determines at step S6 whether the video output value of the present pixel is equal to the video output value of the same fastscan positioned pixel in the previous scanline. If Step S6 determines that the video output value of the present pixel is not equal to the video output value of the same fastscan positioned pixel in the previous scanline, Step S61 generates a new error value which is equal to the accumulated error value plus $\Delta p_s$*(white value–black value) and this error is diffused. On the other hand, if Step S6 determines that the video output value of the present pixel is equal to the video output value of the same fastscan positioned pixel in the previous scanline, the accumulated error value is diffused.

Figure 7:
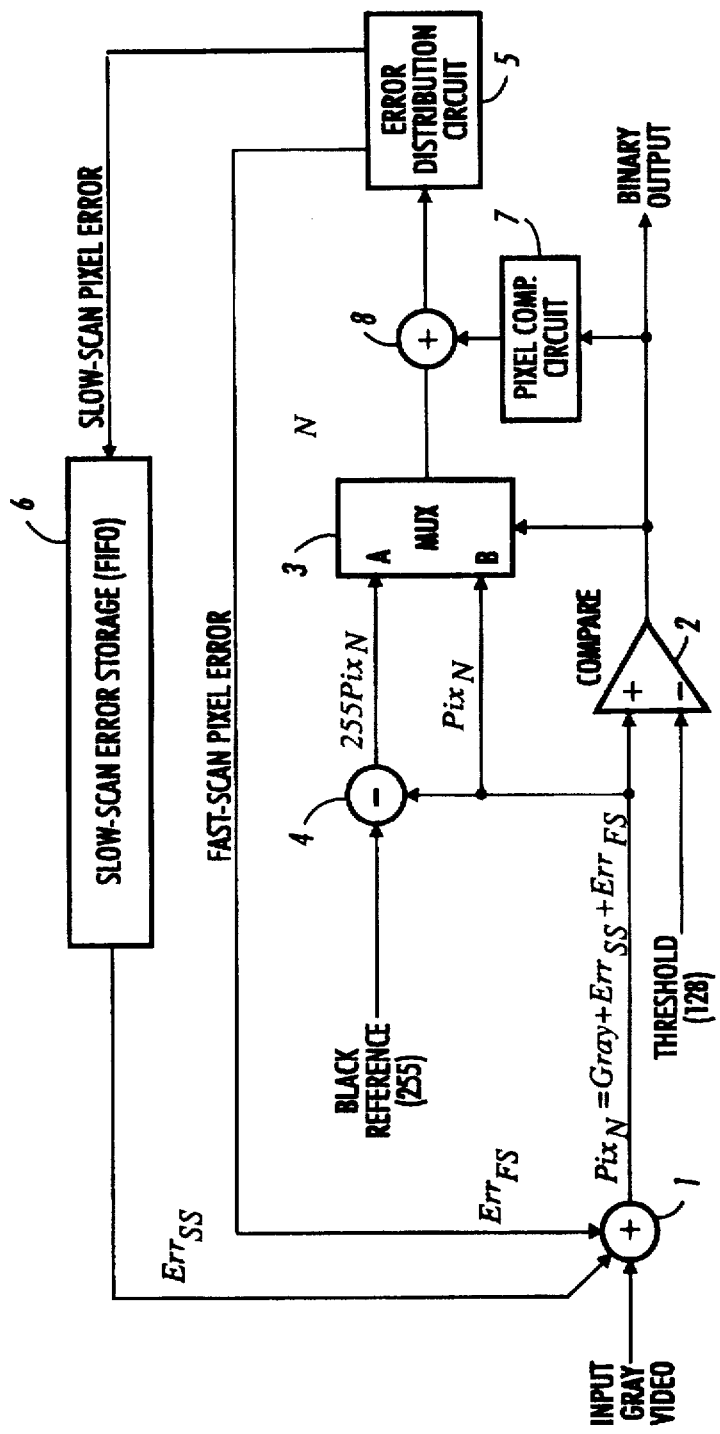
FIG. 7 shows a block diagram illustrating a circuit for implementing pixel growth compensation according to the present invention.

FIG. 7 illustrates a hardware implementation of the processes illustrated in FIGS. 5 and 6. More specifically, FIG. 7 illustrates the pixel growth compensation process as adapted for a conventional error diffusion environment; however, this adaptation is readily applicable to a hybrid error diffusion process, high addressable error diffusion process, or a high addressable hybrid error diffusion process.

As illustrated in FIG. 7, input grey video is inputted to an adder 1 wherein slowscan error, which represents error from the processing of the previous scanline of pixels, stored in a FIFO 6 is added to the input grey video. Moreover, fastscan error from an error distribution circuit 5 is also added to the input grey video at adder 1. The fastscan error from the error distribution circuit 5 represents the error from processing the previous pixel in the same scanline. The modified input grey video ($Pix_N$) is then fed to a comparator 2 which compares the modified input grey video with a threshold value. Based on the comparison with the threshold value, the comparator 2 outputs a binary output of either 1 or 0.

The modified input grey video is also fed to a subtraction circuit 4 and a multiplexer 3. Subtraction circuit 4 generates a value representative of the difference between a black reference value and the modified input grey video value. This difference is also fed to multiplexer 3. Multiplexer 3 selects either the difference value or the modified input grey video value as the pixel error for the presently processed pixel based on the binary output from comparator 2. This pixel error is fed to an adder 8 which adds a pixel compensation value generated by pixel growth compensation circuit 7. Pixel growth compensation circuit 7 performs the processes described above utilizing buffers, comparators, multiplexers, and an adder. The sum from adder 8 is fed to the error distribution circuit 5 which utilizes a plurality of weighting coefficients to distribute the error to various adjacent pixels.

As noted above, the present invention is also applicable to applicable to a hybrid error diffusion process, high addressable error diffusion process, or a high addressable hybrid error diffusion process.

Figure 2:
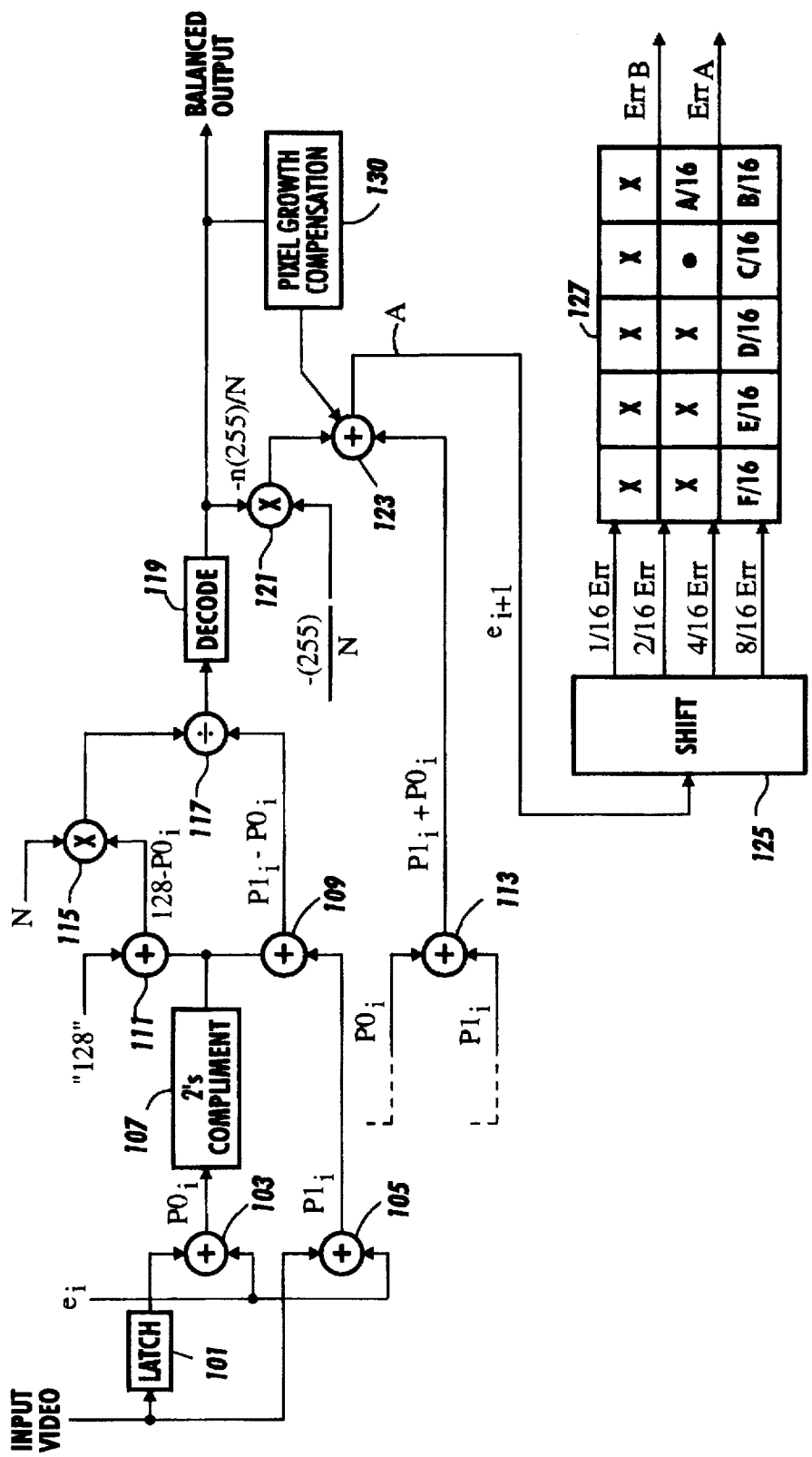
FIG. 2 shows a block diagram illustrating a high addressable error diffusion circuit according to the present invention.
Figure 3:
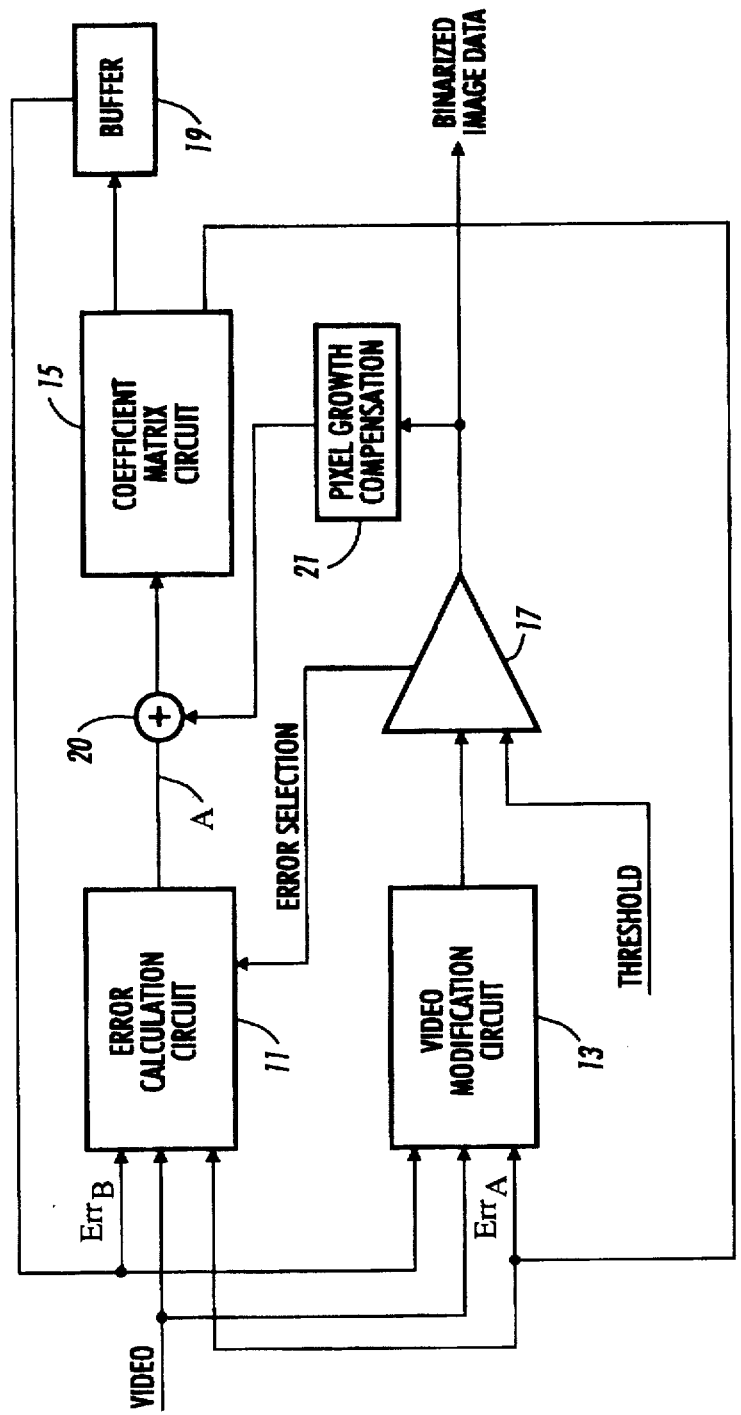
FIG. 3 shows a block diagram illustrating another high addressable error diffusion circuit according to the present invention.
Figure 4:
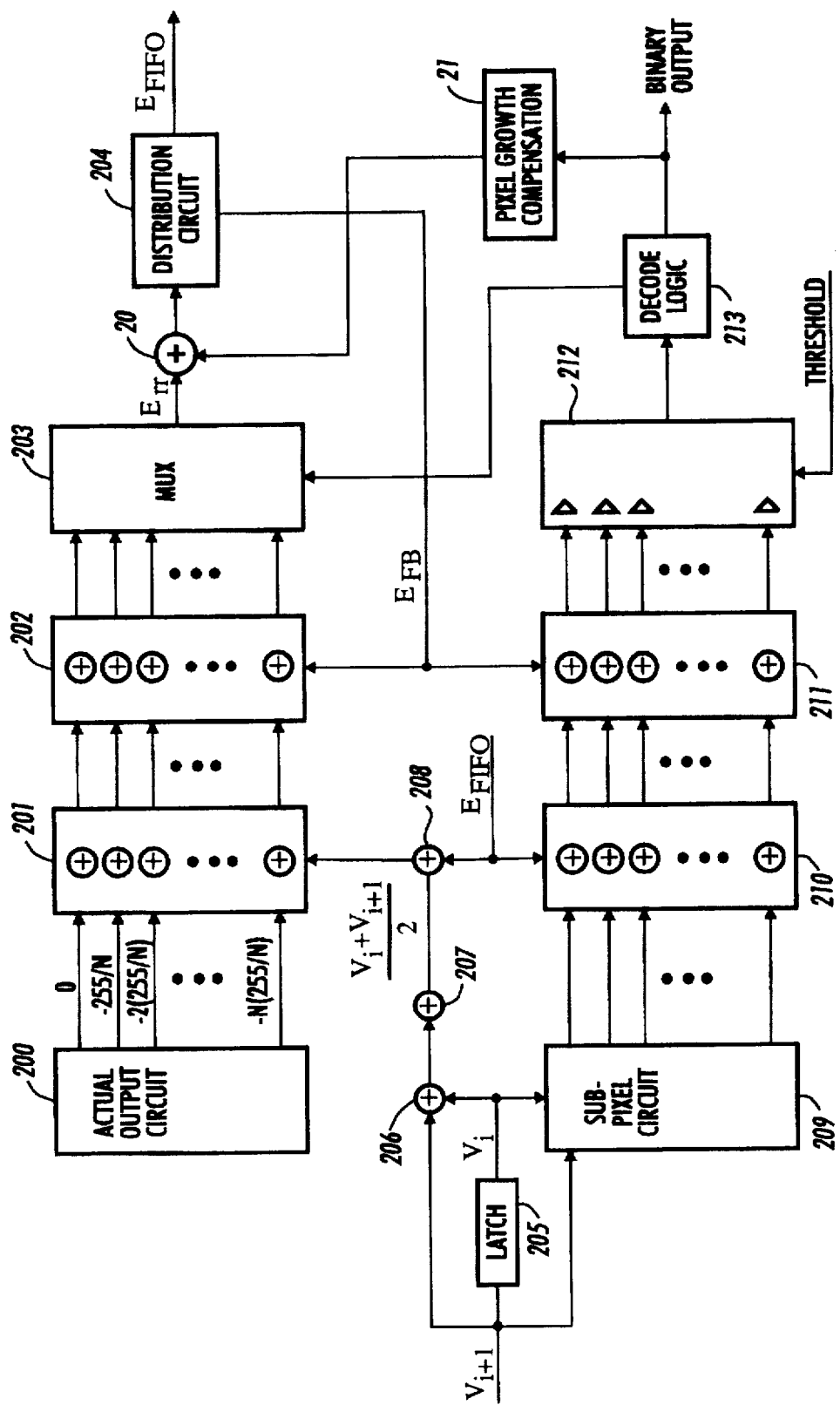
FIG. 4 shows a more detailed block diagram of FIG. 3 according to the present invention.

For example, FIGS. 2–4, illustrate the application of the present invention to a high addressable error diffusion process.

In FIG. 2, the input video signal is split and latched in latch 101 so as to produce the pixel values $V0_i$ and $V1_i$. $V0_i$ represents the latched input video signal $V1_i$ as noted above, and $V0_i$ represents the pixel value just proceeding the pixel value $V1_i$ in the same scanline. The pixel value $V0_i$ is fed into an adder 103 with the error component $e_i$. Moreover, the error component $e_i$ is fed into an adder 105 along with the input video signal $V1_i$. The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i$–$P0_i$. Negative $P0_i$ is also fed into adder 111 which is summed with the threshold value. In this example, the threshold value is 128 and the maximum grey level value for a pixel is 255.

The sum from adder 111 is fed into multiplier 115 so that the value (128–$P0_i$) can be multiplied by the high addressability characteristic value N. The resulting product is then divided by the sum from adder 109 by a divider circuit 117. The resulting quotient is fed into a decoder 119. More specifically, the decoder 119 determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value (–255/N). The product of multiplier 121 is added to a sum generated by an adder 113 and to the pixel growth compensation value generated by pixel growth compensation circuit 130 in adder 123. Pixel growth compensation circuit 130 performs the processes described above utilizing buffers, comparators, multiplexers, and an adder. Moreover, adder 113 adds the values $P0_i$ and $P1_i$ to produce the value $P1_i$+$P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_B$ is distributed to the next pixel in the same scanline and the other half of the error $Err_A$ is distributed to various pixels in the next scanline according to the weighting coefficients established in the error distribution circuit 127.

FIG. 3 illustrates a functional block diagram of the parallel pipeline high addressability error diffusion circuit having pixel growth compensation according to a preferred embodiment of the present invention. In FIG. 3, the input video signal is fed into an error calculation circuit 11 and a video modification circuit 13. The error components $e_{FIFO}$ ($Err_B$) and $e_{FB}$ ($Err_A$) are also fed into the error calculation circuit 11.

The error calculation circuit 11 calculates all the various possible error values that can result from the presently occurring binarization process. The selection of the proper error to be output by the error calculation circuit 11 is based upon the received error selection signal which will be discussed in more detail below.

The selected error value from the error calculation circuit 11 is fed into an adder 20 which adds the selected error value with a pixel growth compensation value generated by pixel growth compensation circuit 21. Pixel growth compensation circuit 21 performs the processes described above utilizing buffers, comparators, multiplexers, and an adder. The results of adder 20 represents the error component $e_{i+1}$ which is fed to a coefficient matrix circuit 15 that distributes the error based upon a set of weighting coefficients. The coefficient matrix circuit 15 splits the error values into the two components $e_{FIFO}$ ($\text{Err}_B$) and $e_{FB}$ ($\text{Err}_A$). As noted before, the feedback error, $\text{Err}_A$, is fed back to the video modification circuit 13 and the error calculation circuit 1 from the coefficient matrix circuit 15. The video modification circuit 13 also receives the $\text{Err}_B$ from buffer 19.

The video modification circuit 13 produces the interpolated subpixel values for the high addressability error diffusion method wherein the interpolated subpixel values are fed into the binarization circuit 17 along with a threshold value. In the preferred embodiment of the present invention, the threshold value is 128. However, it is noted that this threshold value can be any value.

The binarization circuit 17 binarizes the inputted video data so as to output binarized image data for the utilization by an image rendering device. The binarization circuit 17 also produces the error selection signal which is utilized by the error calculation circuit 11 to choose the correct error value to be fed to the coefficient matrix circuit 15. This error selection signal represents the number of interpolated subpixels which are turned ON during the binarization process. Thus, the error calculation circuit 1 may include a multiplexer to make this selection.

As illustrated in FIG. 3, the error calculation circuit 11 is in parallel with the video modification circuit 13 and the binarization circuit 17. Moreover, the high addressability error diffusion architecture of the present invention is implemented on an ASIC, thereby enabling hardware implementation so that the image data can be binarized within the time constraints and throughput specifications of a high speed image rendering device.

FIG. 4 illustrates a detail block diagram of the circuit of a preferred embodiment of the present invention. In FIG. 4, pixel values $V_i$ and $V_{i+1}$ are obtained by the utilization of a latch 205 which latches the video signal so that two adjacent fastscan pixels are available for processing. The pixel values $V_i$ and $V_{i+1}$ are summed in adder 206 and the sum is divided in half by divider 207. The result from divider 207 is fed into adder 208 with the error term $e_{FIFO}$. The sum from adder 208 represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N possible actual outputs will be generated. Also in parallel to the above described process, a subpixel circuit generated all the interpolated subpixels based on the screened pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to downstream pixels. The error term is selected based on a control signal received from the decode logic circuit 213. The selected error term is fed into an adder 20 which adds the selected error value with a pixel growth compensation value generated by pixel growth compensation circuit 21. Pixel growth compensation circuit 21 performs the processes described above utilizing buffers, comparators, multiplexers, and an adder. The results of adder 20 represents the error component $e_{i+1}$ which is fed to a distribution circuit 204 which produces the next feedback error and the error to be stored in a buffer for utilization in the processing of the next scanline.

The above described processes can also be carried out in a hybrid error diffusion process. In the hybrid process the input video values are screened prior to being processed by the error diffusion process.

For example, a hybrid error diffusion process is a process which has combined screening with error diffusion. In such a process, an unmodified video or image signal is screened by a modulator to produce a modified signal $V_S'$ using a preferred equation of $V_S'=(G_L-V_i)+(S_i-Th)$, wherein $S_i$ is equal to screen values derived from a halftone screen pattern, $V_i$ is the grey input video, $G_L$ is a maximum grey level value for a pixel in the system, and Th is the threshold value used in the binarization process.

This modified signal $V_S'$ is fed into an adder where the signal is further modified by the addition of an error value propagated from upstream processed pixel locations to produce $V_S''(V_S''=V_S'+e_i)$. The error component ($e_{FIFO}+e_{FB}$) utilized by the adder is received from an error buffer ($e_{FIFO}$) which stores the propagated error and a binarization circuit ($e_{FB}$).

The further modified signal $V_S''$ is fed into the binarization circuit which converts the multi-level modified signal $V_S''$ to a binary output by utilizing an error diffusion/ threshold process. Some of the error ($e_{FB}$) from this process is fed back directly to the next to be processed pixel, while the rest ($e_{FIFO}$) is stored in the error buffer for processing of pixels in the next scanline. The apportionment of the error is based on weighting coefficients. Any set of coefficients can be used. In the preferred embodiment of the present invention, the weighting coefficients are the coefficients described in U.S. Pat. No. 5,353,127. The entire contents of U.S. Pat. No. 5,353,127 are hereby incorporated by reference.

In this binarization process, the error that is produced represents the difference between the desired output, the multi-level image data value, and the actual output value which is either 255 or 0 if the multi-level of the image data is represented by 8 bits. This error is compensated for pixel growth as described above and is diffused, thereby retaining as much grey level information as possible.

Lastly, the present invention can be applied in a process which corrects for spot overlap using a tonal reproduction curve. This process will be briefly described below.

Figure 8:
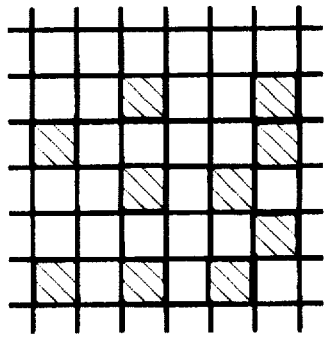
FIG. 8 shows a graphical representation of the dot pattern of an ideal printer.

Typically, an individual output "dot" area of any printer does not correlate perfectly to the resolution of the printer. More specifically, as illustrated in FIG. 8, in an "ideal"

printer, the output would be rectangular to match the resolution of the input scanners photodiodes used to generate each grey scale pixel value, and thus, the "dot" areas would not cross over a pixel boundary from one "dot" to the next.

Figure 9:
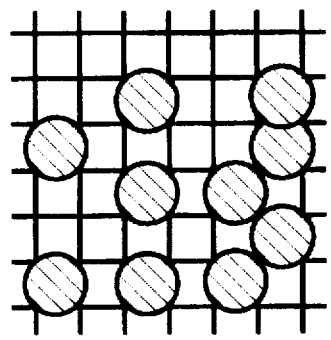
FIG. 9 shows a graphical representation of the dot pattern of a non-ideal printer.
Figure 10:
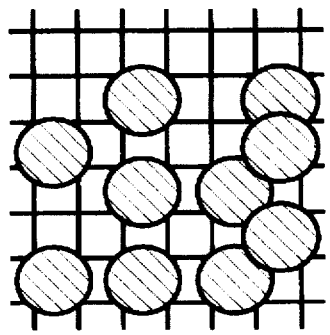
FIG. 10 shows a graphical representation of the dot pattern of another non-ideal printer.

However, as noted above, the individual output "dot" area of most printers does not correlate perfectly to the resolution of the printer. For example, laser, ink jet, and dot matrix printers render a circular spot the size and shape of which will vary from device to device. Examples of such situations are illustrated in FIGS. 9 and 10. More specifically, FIGS. 9 and 10 illustrate the typical situation depicting the physical and visual effects that spot overlap produces on the overall darkness/lightness of an array of dots rendered on a bi-level write black printer magnified within a region.

The spot overlap effect tends to accelerate the density of a white to black grey scale transition, and is especially important in the case of error diffusion and hybrid error diffusion processing since the error to be propagated and added to the downstream pixels is generated from an ideal black pixel value. The error which should be propagated downstream is therefore somewhat larger; i.e., more towards white; than the error which would have been produced in the classical error diffusion process. This is necessary since both an individual dot and the overall appearance of a cluster of dots on a hardcopy output will be darker than expected.

Figure 15:
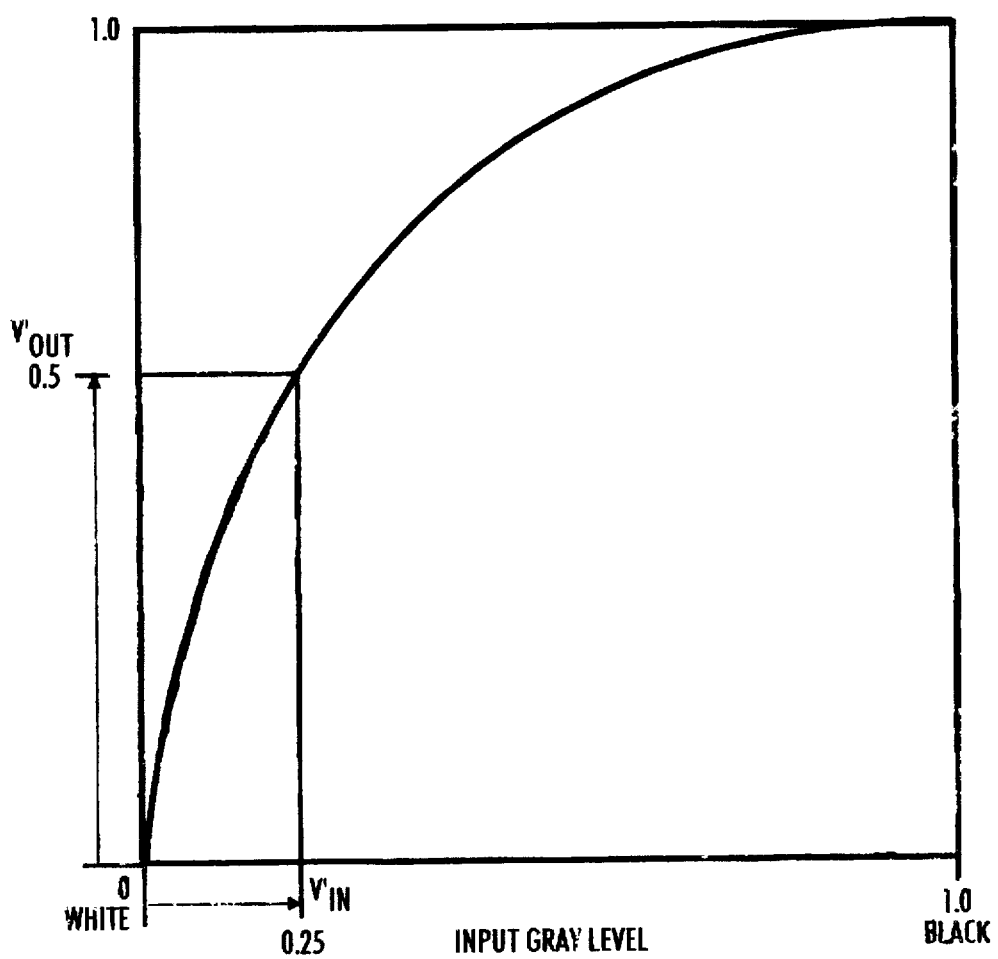
FIG. 15 shows a tonal reproduction curve illustrating the general shape of the input and output grey level relationship for a convention binary printing device utilizing a standard error diffusion process.

The spot area overlap compensation aspects will now be explained in more detail. As noted before, a possible solution to correcting for spot overlap in an error diffusion environment is to utilize a tonal reproduction curve adjustment method. However, when utilizing a tonal reproduction curve adjustment in a high addressability hybrid error diffusion process, the tonal reproduction curve is generally non-linear. Examples of this non-linearity are illustrated in FIGS. 11 and 15.

Figure 11:
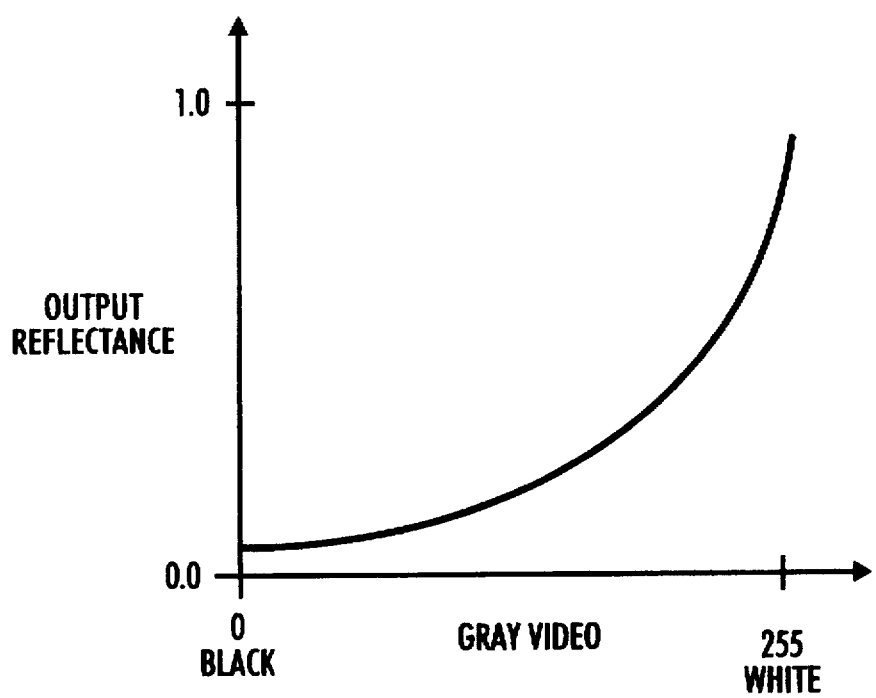
FIG. 11 shows a tonal reproduction curve illustrating the general shape of the input and output grey level relationship for a convention binary printing device utilizing a standard error diffusion process.

As illustrated in FIG. 11, the relationship between the input grey video value and the output reflectance is non-linear as the input grey video value increases in value from black to white. On the other hand, as illustrated in FIG. 15, the relationship between the input grey video value and the output reflectance also is non-linear as the input grey video value increases in value from white to black. Since the tonal reproduction curve is non-linear, it is necessary to linearize the tonal reproduction curve in order to utilize such a method in a high addressability hybrid error diffusion process.

Figure 12:
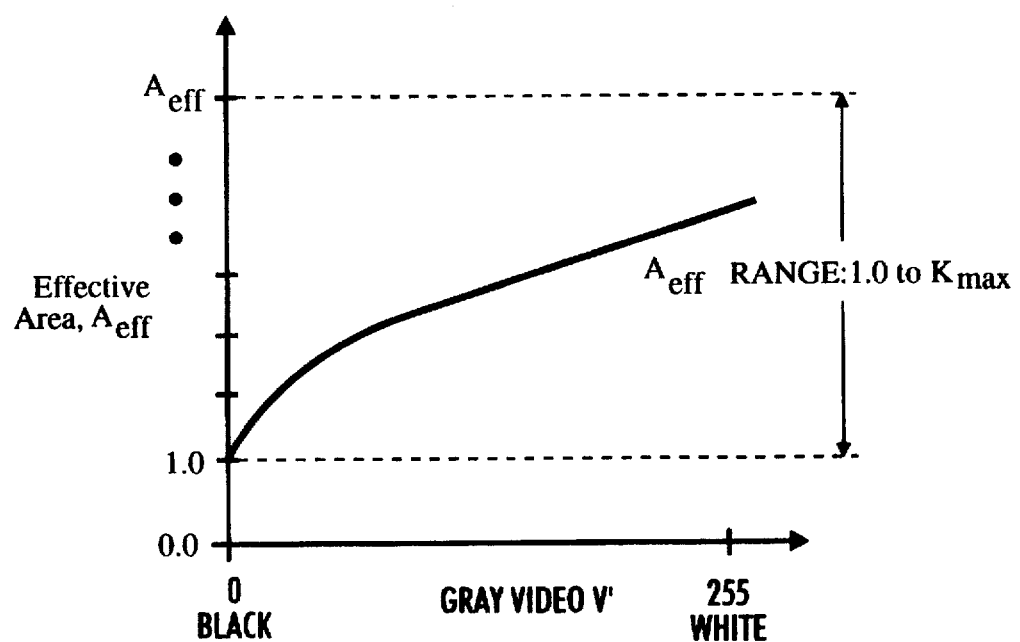
FIG. 12 shows a linearized tonal reproduction curve.

A typical spot area compensation transfer curve which has been linearized is illustrated in FIG. 12. The effective area at the black end is normalized in reference to 1.0 since any additional spot overlap at this point does not significantly affect the reflectance value; i.e., in a xerographic printing device, the more toner particles deposited on top of toner particles does not make the image darker. The effective spot area gradually increases when moving towards the white end since the spot overlap effect will tend to have a greater impact on the images reflectance value (since there will be more isolated spots) and thus more compensation is needed to force a linear reflectance profile. As mentioned above, the profile of the spot overlap compensation curve will depend on the print characteristics of the image output terminal or printing device. A programmable spot overlap lookup table therefore enables the necessary flexibility required for tone reproduction correction for future printers with various output print characteristics.

Figure 13:
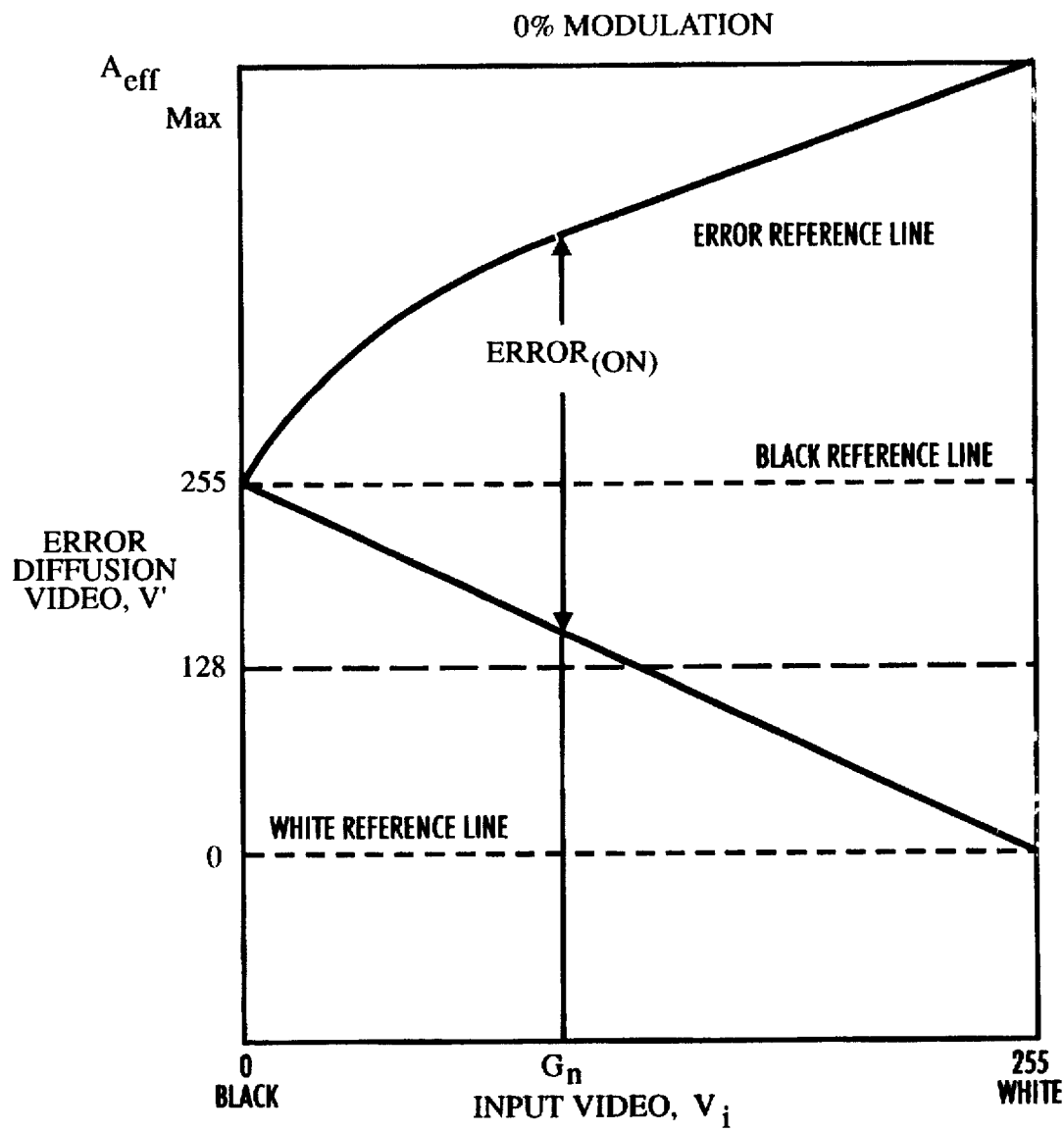
FIG. 13 shows a graphical superimposition of a linearized TRC on a video transformation.
Figure 14:
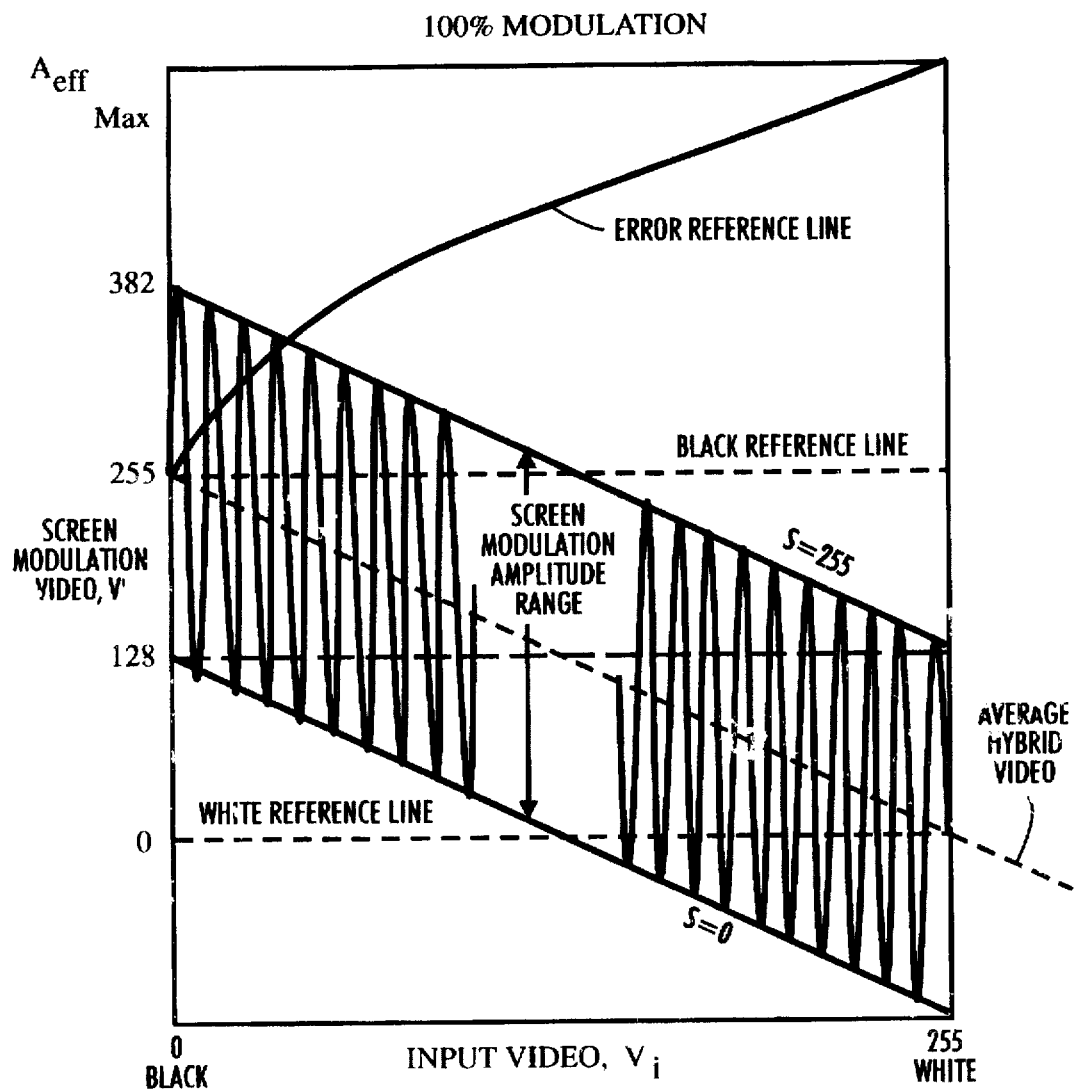
FIG. 14 shows a graphical superimposition of a linearized TRC on a hybrid video transformation.

The effective spot gain curve can be superimposed on a hybrid transformation curve to illustrate the magnitude of the error to be propagated downstream. It is noted that the magnitude of the error to be propagated downstream is a function of the input grey video value. The superimposing of the effective spot gain curve is illustrated in FIGS. 13 and 14 wherein FIG. 13 illustrates a situation for 0% modulation and FIG. 14 represents the situation for 100% modulation.

Conventionally, the black reference line is used to calculate the error to be propagated downstream. However, in the present invention, the error reference line is used to calculate the error to be propagated downstream wherein the error reference line is a function of the input grey level. Moreover, the utilization of the error reference line to calculate the error works for both 0% modulation and 100% modulation because the average hybrid video for any given input grey level is equal when utilizing a properly designed symmetric screen. Hence, the average error propagated to the downstream pixels is essentially the same between the two modulation extremes for any grey level input.

Figure 16:
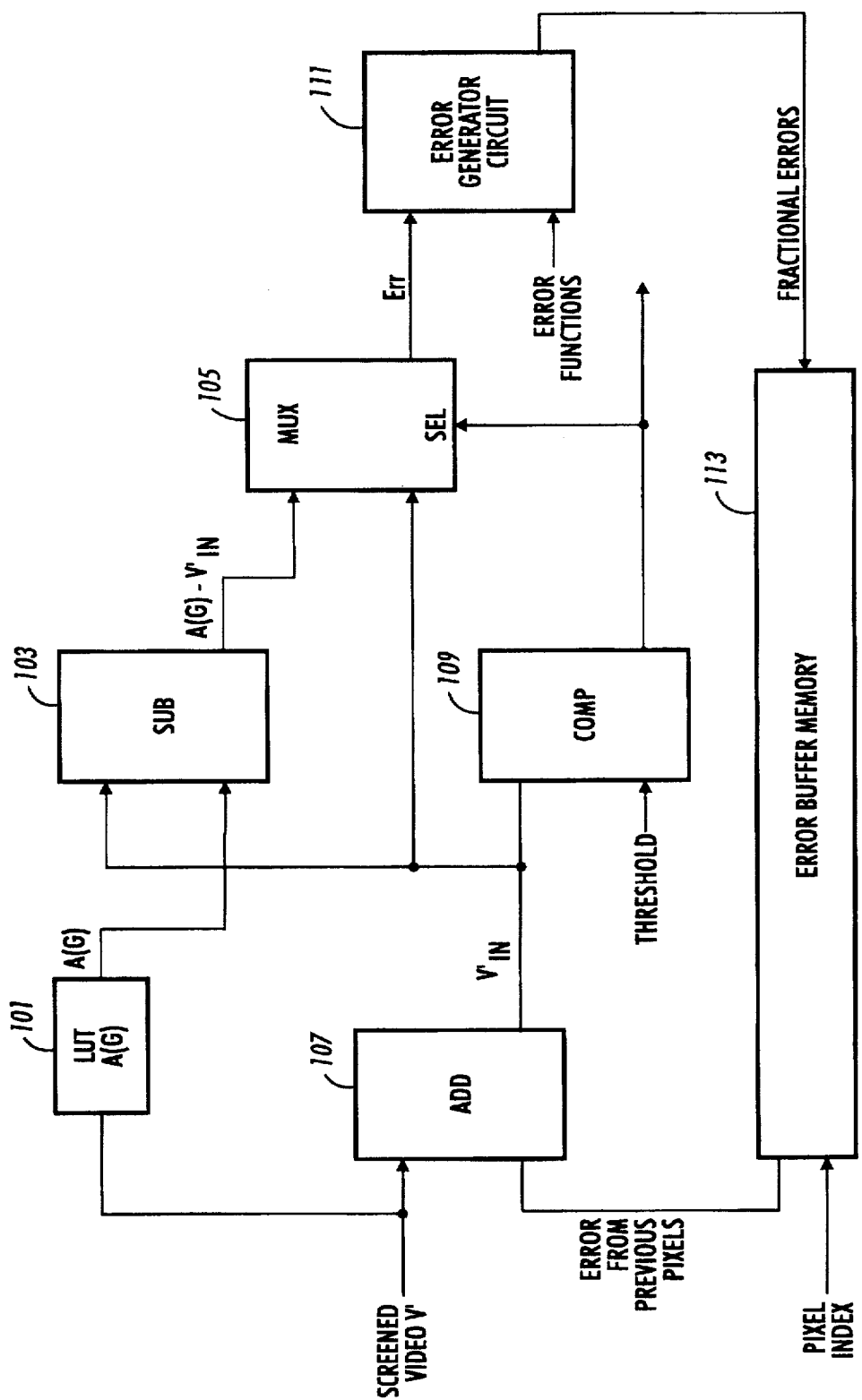
FIG. 16 shows a block diagram illustrating a circuit embodiment for implementing an error diffusion according to the concepts of the present invention.

FIG. 16 illustrates a block diagram wherein the tonal reproduction curve (TRC) for a printer using a hybrid error diffusion process is linearized. More specifically, rather than performing a deterministic computation of the spot coverage of each new black pixel as described in the U.S. Pat. No. 5,087,981, the present invention empirically deduces the effective area. This empirically deduced effective area is then utilized to compensate the error diffusion process so that the TRC is substantially linearized.

The process for empirically deducing the effective area will be explained in detail by utilizing FIG. 15. Initially, test patches are printed from ranging white to black with any standard or conventional error diffusion process. Thereafter, the reflectance of each test patch is measured. Since the input grey level $G_{in}$ for each printed test patch is known, one can plot the output grey level $G_{out}$ (the measured reflectance) of the test patches versus the known input grey level value $G_{in}$. In this regard, the plot generates a curve similar to that illustrated in FIG. 15. Since when utilizing a standard or conventional error diffusion process the measure output grey level $G_{out}$ will exceed that of the input grey level $G_{in}$, the statistical effective area of a printed black spot can be calculated by $A_{eff}=G_{out}/G_{in}$ and represented by A(G). Thus, the effective spot area A(G) can be tabulated as a function of $G_{out}$.

This new effective spot area A(G) is then utilized in determining the error to be propagated to downstream neighboring pixels in the hybrid error diffusion process. More specifically, when a binary printing device prints a black pixel and the hybrid error diffusion modified input grey level is $G'_{in}$, wherein $G'_{in}$ is equal to $(G_L-V_i)+(S_i-Th)+err$, the error to be propagated to the downstream neighboring pixels is $G'_{in}-A(G)$. On the other hand, when a binary printing device prints a white pixel and the hybrid error diffusion modified input grey level is $G'_{in}$, wherein $G'_{in}$ is equal to $(G_L-V_i)+(S_i-Th)+err$, the error to be propagated to the downstream neighboring pixels is $G'_{in}$.

As noted above, FIG. 16 illustrates a circuit which implements such a compensated hybrid error diffusion process. In FIG. 16, an input grey value $G_{in}$, wherein $G_{in}$ is equal to $(G_L-V_i)+(S_i-Th)$, is received by an adder 107. The adder 107 also receives the accumulated error (err) generated from neighboring pixels which has been propagated to the pixel location associated with the input grey value $G_{in}$. These two values are added by the adder 107 to produce a error diffusion modified input grey value $G'_{in}$, wherein $G'_{in}$ is equal to $(G_L-V_i)+(S_i-Th)+err$.

The modified grey value $G'_{in}$ is received by a comparator 109, a multiplexer 105, and a subtraction circuit 103. In the preferred embodiment, the grey level or video range of the image data is 0 to 255. In the comparator 109, the modified grey value $G'_{in}$ is compared with a threshold value to determine whether a pixel is to be printed or not. In the preferred embodiment of the present invention, the threshold value is 128; however, any threshold value or threshold process can be utilized.

The output from the comparator 109 represents whether a printer will print a pixel or not and is fed into the multiplexer 105 as well as to the printing device for proper rendering. The input grey value $G_{in}$ is also received by a look-up table 101 which stores the empirically deduced effective spot area A(G) values for that particular printing device. The values are pre-tabulated through the printing of test patches and the measuring of the reflectance of these test patches. Based on the input grey value $G_{in}$, the look-up table 101 outputs the associated effective spot value A(G). This effective spot area value A(G) is fed to the subtraction circuit 103 wherein the subtraction circuit 103 subtracts the effective spot area value A(G) from the modified grey value $G'_{in}$. The result of the subtraction circuit 103 is fed to the multiplexer 105.

The multiplexer 105 selects either the value $G'_{in}$ or the value $G'_{in}-A(G)$ based on the output received from comparator 109. More specifically, if the output will cause a black pixel is to be printed; i.e., $G'_{in}$ is greater than the threshold value; the multiplexer selects the input value of $G'_{in}-A(G)$. On the other hand, if the comparator 109 determines that a white pixel is to be generated; i.e., the value $G'_{in}$ is less than the threshold value; the multiplexer selects the value $G'_{in}$ to output.

The output value from the multiplexer 105 reflects the error value, Err, to be propagated to downstream pixels. This error value, Err, is fed into an error generation circuit 111 which produces the actual error values to be propagated to the individual downstream pixels. This error generation circuit 111 may be a multiplier which multiplies the error value, Err, from the multiplexer 105 by various error fraction values or error coefficients. On the other hand, the error generation circuit 111 may be a look-up table which has prestored therein the individual error values to be propagated to the downstream pixels wherein the error values are retrieved from the look-up table based on the error value input value and inputted coefficient values used for the particular error diffusion process.

The individual fractional error values are temporarily stored in an error buffer 113 for proper recall when the pixel associated with the buffered error value is to be processed in the error diffusion process.

Figure 17:
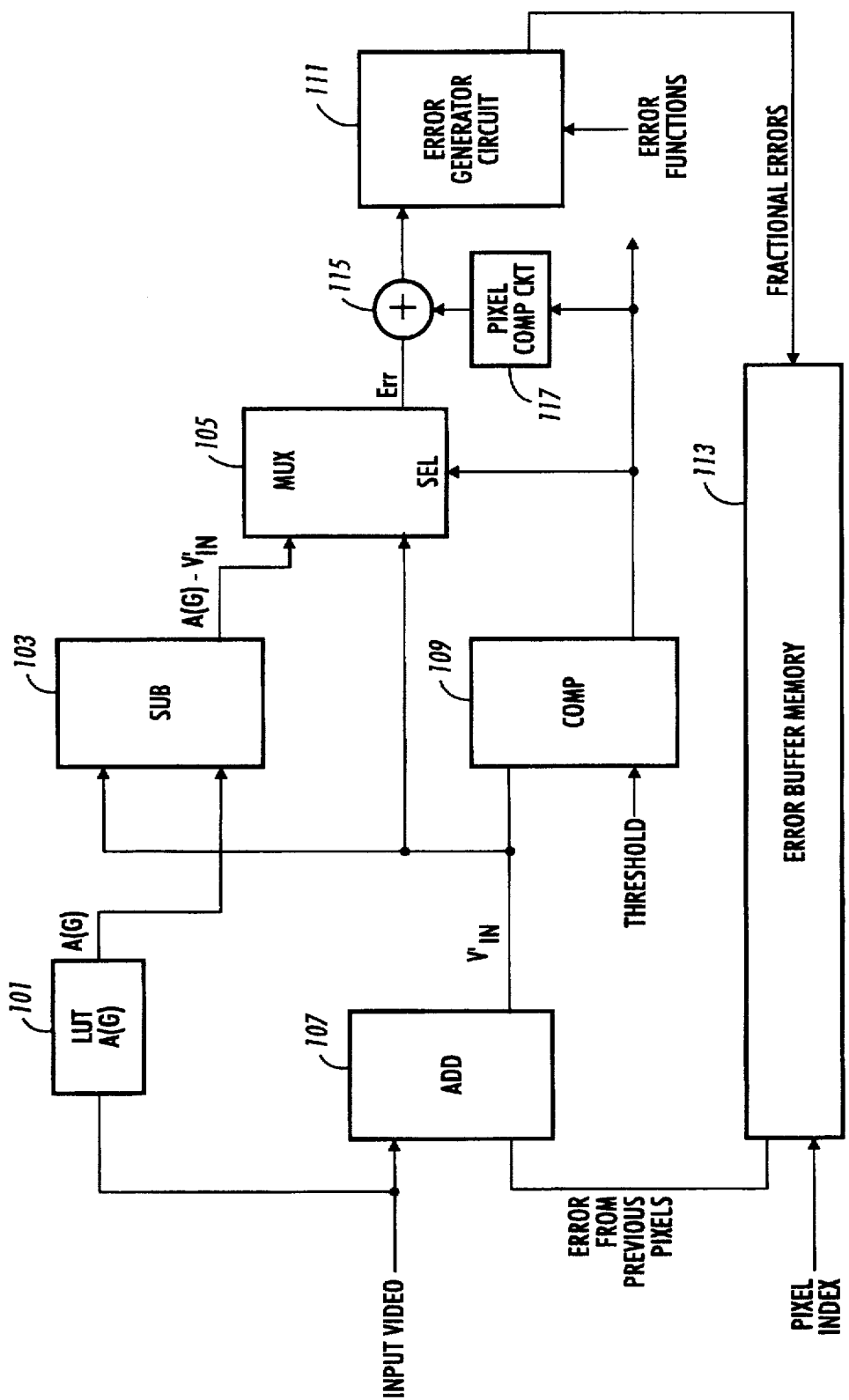
FIG. 17 shows a block diagram illustrating another circuit embodiment for implementing an error diffusion according to the concepts of the present invention.

Lastly, FIG. 17 illustrates another embodiment of the present invention which combines the spot overlap compensation with the pixel growth compensation. In FIG. 17, an input grey value $G_{in}$, wherein $G_{in}$ is equal to $(G_L-V_i)+(S_i-Th)$, is received by an adder 107. The adder 107 also receives the accumulated error (err) generated from neighboring pixels which has been propagated to the pixel location associated with the input grey value $G_{in}$. These two values are added by the adder 107 to produce a error diffusion modified input grey value $G'_{in}$, wherein $G'_{in}$ is equal to $(G_L-V_i)+(S_i-Th)+err$.

The modified grey value $G'_{in}$ is received by a comparator 109, a multiplexer 105, and a subtraction circuit 103. In the preferred embodiment, the grey level or video range of the image data is 0 to 255. In the comparator 109, the modified grey value $G'_{in}$ is compared with a threshold value to determine whether a pixel is to be printed or not. In the preferred embodiment of the present invention, the threshold value is 128; however, any threshold value or threshold process can be utilized.

The output from the comparator 109 represents whether a printer will print a pixel or not and is fed into the multiplexer 105 as well as to the printing device for proper rendering. The input grey value $G_{in}$ is also received by a look-up table 101 which stores the empirically deduced effective spot area A(G) values for that particular printing device. The values are pre-tabulated through the printing of test patches and the measuring of the reflectance of these test patches. Based on the input grey value $G_{in}$, the look-up table 101 outputs the associated effective spot value A(G). This effective spot area value A(G) is fed to the subtraction circuit 103 wherein the subtraction circuit 103 subtracts the effective spot area value A(G) from the modified grey value $G'_{in}$. The result of the subtraction circuit 103 is fed to the multiplexer 105.

The multiplexer 105 selects either the value $G'_{in}$ or the value $G'_{in}-A(G)$ based on the output received from comparator 109. More specifically, if the output will cause a black pixel is to be printed; i.e., $G'_{in}$ is greater than the threshold value; the multiplexer selects the input value of $G'_{in}-A(G)$. On the other hand, if the comparator 109 determines that a white pixel is to be generated; i.e., the value $G'_{in}$ is less than the threshold value; the multiplexer selects the value $G'_{in}$ to output.

The output value from the multiplexer 105 reflects the error value, Err, to be propagated to downstream pixels. This error value, Err, is fed into an adder 115 which adds the error associated with subpixel creation (pixel growth) artifacts. More specifically, adder 115 receives a signal from pixel growth compensation circuit 117 which selects the subpixel creation correction term based on a comparison between the previously processed output video signal and the presently processed output video signal. The error correction value is either zero or $\Delta p^*(W_v-B_v)$. This process is also applicable to a high addressable environment in that the correction error value is set according to that environment. The sum from adder 115 is fed to error generation circuit 111 which produces the actual error values to be propagated to the individual downstream pixels.

Thus, utilizing the various embodiments described above, the present invention can compensate for pixel growth in an error diffusion environment, thereby enabling the rendering of a higher quality image.

In describing the present invention, the terms pixel and subpixel have been utilized. These terms may refer to an electrical (or optical, if fiber optics are used) signal which represent the physically measurable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

The present invention has been described in detail above; however, various modifications can be implemented without departing from the spirit of the present invention. For example, the preferred embodiment of the present invention has been described with respect to a printing system; however, this high addressability hybrid error diffusion compensation method is readily implemented in a display system. Moreover, the high addressability hybrid error diffusion compensation method of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level image output terminal or higher.

Lastly, the present invention has been described with respect to a monochrome or black/white environment. However, the concepts of the present invention are readily applicable to a color environment. Namely, the error diffusion compensation process of the present invention can be applied to each color space value representing the color pixel.

In recapitulation, the present invention provides a high addressability hybrid error diffusion method or module which enables an image processing system to convert an electronic document of one format to that of another format utilizing a pixel growth compensation value.

While the present invention has been described with reference to various embodiments disclosed herein before, it is not to be combined to the detail set forth above, but is intended to cover such modifications or changes as made within the scope of the attached claims.

What is claimed is:

1. A method of reducing a number of levels in a multi-level grey scale pixel value representing a pixel and diffusing an error generated from reducing the number of levels, comprising the steps of:

(a) receiving the multi-level grey scale pixel value of a first resolution;

(b) reducing the number of levels in the multi-level grey scale pixel value;

(c) generating an error value as a result of the reduction process in said step (b);

(d) modifying the generated error value based on a pixel growth compensation value dependent on a detection of a black/white edge between adjacent pixels; and (e) diffusing the error value to multi-level grey scale pixel values of adjacent pixels.

2. The method as claimed in claim 1, further comprising the step of:

(f) converting the multi-level grey scale pixel value to a second resolution prior to the execution of said step (b), the second resolution being higher than the first resolution;

said step (c) generating an error value having a resolution corresponding to the first resolution.

3. The method as claimed in claim 2, wherein said step (f) comprises the substeps of:

(f1) computing a first multi-level grey scale pixel value; and (f2) computing a second multi-level grey scale pixel value.

4. The method as claimed in claim 3, wherein said step (f) comprises the substep of:

(f3) computing a plurality of multi-level grey scale subpixel values $B_n$, the multi-level grey scale subpixel values $B_n$ being equal to $P0+n(P1-P0)/N$, wherein n is equal to 0 to N−1, P0 is equal to the first multi-level grey scale pixel value, P1 is equal to the second multi-level grey scale pixel value, and N is equal to a high addressability characteristic.

5. The method as claimed in claim 1, wherein said step (d) generates a fastscan pixel growth compensation value when a video output corresponding to a previous pixel in a fastscan direction with respect to the pixel being processed is different from a video output corresponding to the pixel being processed.

6. The method as claimed in claim 1, wherein said step (d) generates a slowscan pixel growth compensation value when a video output corresponding to a previous pixel in a slowscan direction with respect to the pixel being processed is different from a video output corresponding to the pixel being processed.

7. The method as claimed in claim 5, wherein said step (d) generates a slowscan pixel growth compensation value when a video output corresponding to a previous pixel in a slowscan direction with respect to the pixel being processed is different from a video output corresponding to the pixel being processed.

8. The method as claimed in claim 1, further comprising the steps of:

(f) generating an effective spot area value based on the received multi-level grey scale pixel value;

(g) modifying the error value generated by said step (c) by the effective spot area value based on a value of the reduced multi-level grey scale pixel value prior to executing said step (d).

9. The method as claimed in claim 1, further comprising the step of:

(f) converting the multi-level grey scale pixel value to a screened multi-level grey scale pixel value prior to executing said step (b).

10. A system for reducing a number of levels in a multi-level grey scale pixel value representing a pixel and diffusing an error generated from reducing the number of levels, comprising:

input means for receiving the multi-level grey scale pixel value, the multi-level grey scale pixel value having a first resolution;

reduction means for reducing the number of levels in the multi-level grey scale pixel value;

pixel growth compensation means for generating a pixel growth compensation value based on a detection of a black/white edge between adjacent pixels;

error means for generating an error value based on the reduction of the multi-level grey scale pixel value;

summing means for adding the pixel growth compensation value to the error value; and error diffusing means for diffusing the modified error value to multilevel grey scale pixel values of adjacent pixels.

11. The system as claimed in claim 10, wherein said pixel growth compensation means generates a fastscan pixel growth compensation value when a video output corresponding to a previous pixel in a fastscan direction with respect to the pixel being processed is different from a video output corresponding to the pixel being processed.

12. The system as claimed in claim 10, wherein said pixel growth compensation means generates a slowscan pixel growth compensation value when a video output corresponding to a previous pixel in a slowscan direction with respect to the pixel being processed is different from a video output corresponding to the pixel being processed.

13. The system as claimed in claim 12, wherein said pixel growth compensation means generates a slowscan pixel growth compensation value when a video output corresponding to a previous pixel in a slowscan direction with respect to the pixel being processed is different from a video output corresponding to the pixel being processed.

14. The system as claimed in claim 10, further comprising:

screening means for generating a screened multi-level grey scale pixel value; and high addressability means for converting the screened multi-level grey scale pixel value to a second resolution, the second resolution being higher than the first resolution;

said reduction means reducing the number of levels in the screened multi-level grey scale pixel value having the second resolution.

15. A method of generating an error value, comprising the steps of:

(a) generating a screened multi-level grey scale pixel value representing a pixel having a first resolution;

(b) converting the screened multi-level grey scale pixel value to a second resolution, the second resolution being higher than the first resolution;

(c) thresholding the screened multi-level grey scale pixel value representing the pixel having the second resolution;

(d) generating the error value as a result of thresholding the screened multi-level grey scale pixel value in said step (c), the error value having the first resolution;

(e) generating a pixel growth compensation value based on a detection of a black/white edge between adjacent pixels; and (f) modifying the generated error value based on the generated pixel growth compensation value.

16. The method as claimed in claim 15, further comprising the step of:

(g) diffusing the error value to multi-level grey scale pixel values of pixels adjacent to the pixel being thresholded.

17. A printing system for rendering marks on a recording medium, comprising:

receiving means for receiving a multi-level grey scale pixel value representing a pixel having a first resolution;

binarization means for binarizing the converted multi-level grey scale pixel value so as to output a binary signal and an error value;

pixel growth compensation means for generating a pixel growth compensation value based on a detection of a black/white edge between adjacent pixels;

modifying means for modifying the error value based on the generated pixel growth compensation value;

diffusing means for diffusing the modified error value to multi-level grey scale pixel values corresponding to pixels adjacent to the pixel having the first resolution; and rendering means for converting the binary signal into a mark on the recording medium.

18. The system as claimed in claim 17, further comprising:

screening means for generating a screened the multi-level grey scale pixel value; and interpolation means for converting the screened multi-level grey scale pixel value to a second resolution, the second resolution being higher than the first resolution;

said binarization means binarizing the converted multi-level grey scale pixel value so as to output a binary signal and an error value, the error value having a resolution equal to the first resolution.

19. A system for generating an error, comprising:

receiving means for receiving a multi-level grey scale pixel value representing a pixel having a first resolution;

binarization means for binarizing the converted multi-level grey scale pixel value so as to output a binary signal and an error value;

pixel growth compensation means for generating a pixel growth compensation value based on a detection of a black/white edge between adjacent pixels; and modifying means for modifying the error value based on the generated pixel growth compensation value.

20. The system as claimed in claim 19, further comprising:

diffusing means for diffusing the error value to multilevel grey scale pixel values corresponding to pixels adjacent to the pixel having the first resolution.

21. The system as claimed in claim 19, further comprising:

screening means for generating a screened the multi-level grey scale pixel value; and interpolation means for converting the screened multi-level grey scale pixel value to a second resolution, the second resolution being higher than the first resolution;

said binarization means binarizing the converted multi-level grey scale pixel value so as to output a binary signal and an error value, the error value having a resolution equal to the first resolution.

\* \* \* \* \*